United States Patent Office 3,502,552
Patented Mar. 24, 1970

3,502,552
METHOD FOR ANODIC OXIDATION OF TITANIUM AND ITS ALLOYS
Wataru Mizushima, Neyagawa-shi, Osaka-fu, and Yoshio Iida, Hirakata-shi, Osaka-fu, Japan, assignors to Matsushita Electric Industrial Co., Ltd., Osaka, Japan
Filed Nov. 21, 1966, Ser. No. 595,784
Claims priority, application Japan, Nov. 30, 1965, 40/74,566; Dec. 1, 1965, 40/74,419; Feb. 4, 1966, 41/6,823, 41/6,824; Feb. 24, 1966, 41/11,514, 41/11,516
Int. Cl. C23b 9/00
U.S. Cl. 204—56       12 Claims

ABSTRACT OF THE DISCLOSURE

Dielectric films having high insulating properties are formed on titanium and titanium alloys by anodic oxidation in an electrolyte comprising inorganic fluorides, borates, phosphates, organic solvents, and water. Preheating the titanium at above 1000° C. in a reduced pressure of air or at 400°–1000° C. in hydrogen prior to anodizing improves the dielectric properties of the films. Etching of the metal substrate in hydrofluoric and nitric acid before anodizing is also helpful.

This invention relates to an improved method for making a dielectric film on the surface of titanium or titanium alloy by anodic oxidation and more particularly to a composition of anodizing electrolyte.

It has been known that titanium oxide has a dielectric constant of about 100 which is higher than those of tantalum oxide and aluminum oxide. The high dielectric constant of titanium oxide makes possible the manufacture of electrolytic capacitors having a high ratio of dielectric capacitance to volume thereof. Much effort has been expended on the development of electrolytic capacitors of titanium during the past decade. However, the film formed on titanium by anodic oxidation has been inferior in insulating property to those of tantalum and aluminum when the anodizing electrolyte of titanium was similar to those of tantalum and aluminum, i.e. when for example an aqueous soution of borate compound was employed. The use of molten salt, such as sodium nitrate or calcium nitrate, for an anodizing electrolyte has made it possible to improve extensively the insulating property of dielectric film on titanium but has required a large amount of molten salt and high temperature equipment, which result in high cost.

An object of the present invention is to provide a method for making a dielectric film on the surface of titanium or titanium alloy by anodic oxidation, said dielectric film having a high insulating property.

Another object of the invention is to provide a method for making an anodic oxide film of titanium having a high insulating property without employing a molten salt as an anodizing electrolyte.

These and other objects of the invention will become apparent upon consideration of following description taken together with accompanying drawings wherein.

Figure 1:
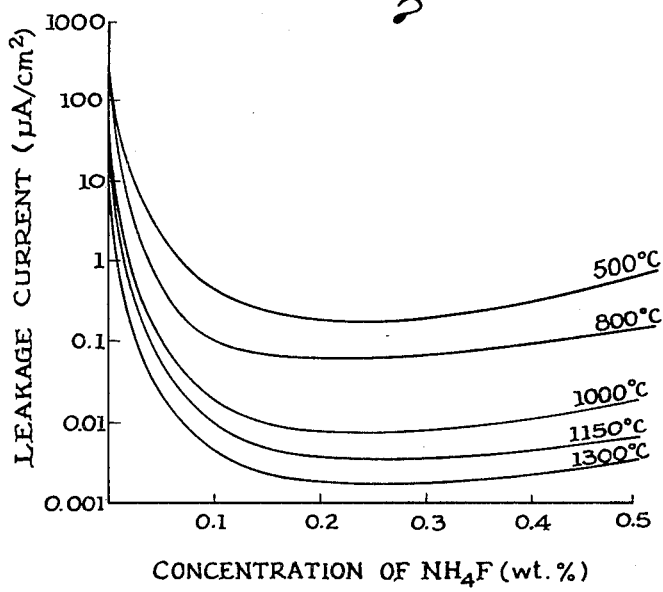
FIG. 1 is a graph showing leakage current of a dielectric film of titanium as a function of the concentration of ammonium fluoride ($NH_4F$) dissolved in an anodizing electrolyte in accordance with this invention.

The prior art of anodic oxidation of titanium, aluminum and tantalum has taught that an anodizing electrolyte comprising a halogen compound impairs the insulating property of the formed dielectric film by partly corroding the formed film. In sharp contrast to such teaching, according to the present invention, an anodizing electrolyte containing in solution therein a small amount of fluorine compound remarkably improves the insulating property of dielectric film formed on the surface of titanium. Operable electrolytes are an aqueous solution dissolving 0.01 to 0.4 wt. percent of ammonium fluoride ($NH_4F$), potassium fluoride ($KF$), sodium fluoride ($NaF$) or hydrofluoric acid ($HF$), and an aqueous solution containing dissolved therein 0.1 to 5.0 wt. percent of antimony fluoride ($SbF_3$), stannous fluoride ($SnF_2$), zinc fluoride ($ZnF_2$) or cadmium fluoride ($CdF_2$). An aqueous solution dissolving 0.1 to 5 wt. percent of a fluoro complex compound, e.g. $NH_4BF_4$, $(NH_4)_2SiF_6$, $Zn(BF_4)_2$ and $ZnSiF_6$ can also be used as an anodizing electrolyte producing a dielectric film of titanium provided with a high insulating property.

It is preferable for increasing the electrical conduction of an aqueous solution containing dissolved therein 0.01 to 0.4 wt. percent of $NH_4F$, $KF$, $HF$ or $NaF$ to add thereto 1 to 10 wt. percent of conductive solute, i.e. $NH_4HB_4O_7$, $KH_2PO_4$ or $H_3PO_4$. An aqueous solution dissolving fluoro complex compound described above or a fluorine compound such as $SbF_3$, $SnF_2$, $ZnF_2$ or $CdF_2$ can be provided with a sufficiently high electrical conductivity without the said conductive solute by employing a high concentration of those compounds such as 0.1 to 5.0 wt. percent.

According to the present invention, an aqueous solution dissolving 0.1 to 5.0 wt. percent of $SbF_3$, $SnF_2$, $ZnF_2$ or $CdF_2$ produces an anodic oxidation film having an extremely high insulating property on the surface of titanium when it is incorporated with 5 to 60 wt. percent of an organic solvent, namely glycerine, methanol, formamide or ethanolamine.

The novel anodizing electrolyte according to this invention can be applied by a formation voltage up to 200 volts and can achieve a novel effect when it is used at a temperature of 5° to 80° C. So-produced dielectric film of titanium has a C. V. value (formation voltage × capacitance per cm.$^2$) of 12, which is higher than that of a dielectric film of tantalum prepared in a conventional manner.

Performance of novel anodizing electrolyte according to the invention can be promoted by pretreating the titanium in a plate or wire form before anodic oxidation. A titanium plate or wire heated above 1000° C. in a reduced pressure of air lower than 10$^{-4}$ mm. Hg can produce a dielectric film having an extremely high insulating property when it is treated with novel anodic electrolyte according to the invention. Another preferable pretreatment is such that the titanium in a plate, wire, or sintered body form is heated at 400° to 1000° C. in hydrogen and cooled to room temperature (about 15° to about 30° C.) in hydrogen for forming titanium hydride.

The effect of the novel anodizing electrolyte on the insulating property of the formed dielectric film of titanium can be emphasized by employing a titanium alloy comprising 1.0 to 10.0 wt. percent of at least one element selected from the group consisting of Al, Mo and V. Said alloy prepared in a conventional manner can produce a dielectric film having a high insulating property thereon by anodic oxidation comprising the novel electrolyte according to the invention when it is etched by an aqueous solution containing 10 to 20 wt. percent of HF and 20 to 60 wt. percent of $HNO_3$ and then is cleaned with water before anodic oxidation.

Anodic oxidation of the titanium may be carried out in a per se well known method. Titanium in a plate form, wire type or as a sintered body is, if necessary, subjected to any of the above pretreatments and is immersed in an anodizing bath containing the aforesaid electrolyte and a cathode inert to said electrolyte. Formation DC voltage is applied across said cathode and titanium at a temperature of 5° to 80° C. The anodically oxidized titanium is washed with water, dried and immersed in an electrolyte such as aqueous solution of 10 wt. percent of $H_3PO_4$ for measuring a leakage current of formed dielectric film in a per se well known method.

EXAMPLE 1

Commercially available titanium plate of a high purity are severally treated with various anodizing electrolytes as listed in Table 1 at 80 v. of formation voltage for 10 minutes at 25° C. in the aforesaid manner. The anodically oxidized titanium shows a leakage current lower than that of titanium treated with a conventional electrolyte having no fluorine compound, as shown in Table 1.

TABLE 1

| Electrolyte Composition Weight %* | Leakage current ($\mu a./cm.^2$) at working voltage of— | | |
|---|---|---|---|
| | 10 v. | 30 v. | 50 v. |
| 5% $NH_4HB_4O_7$, 0.15% $NH_4F$ | 0.05 | 0.4 | 3.0 |
| 5% $KH_2PO_4$, 0.15% KF | 0.03 | 0.4 | 2.5 |
| 5% $H_3PO_4$, 0.15% HF | 0.07 | 0.8 | 7.0 |
| 1% $NH_4BF_4$ | 0.01 | 0.3 | 5.0 |
| 1% $(NH_4)_2SiF_6$ | 0.01 | 0.3 | 5.0 |
| 1% $ZnSiF_6$ | 0.01 | 0.05 | 0.50 |
| 1% $SbF_3$, 50% glycol | 0.005 | 0.01 | 0.08 |
| 1% $ZnF_2$, 50% glycol | 0.005 | 0.02 | 0.12 |
| 1% $SnF_2$, 50% glycol | 0.005 | 0.02 | 0.08 |
| 1% $CdF_2$, 50% glycol | 0.01 | 0.05 | 0.20 |
| 5% $NH_4HB_4O_7$ | 60 | 200 | 1000 |
| 5% $H_3PO_4$ | 120 | 350 | 1500 |

*Remainder of electrolyte composition is water.

EXAMPLE 2

Commercially available titanium plates in a high purity are heated at various temperatures of 500° to 1300° C. in a reduced pressure of about $10^{-6}$ mm. Hg and are furnace-cooled to room temperature (20° to 30° C.). The heated titanium plates are severally subjected to anodic oxidation at 80 volts of formation voltage for 10 minutes at 25° C. by using an aqueous electrolyte comprising 5 wt. percent of $NH_4HB_4O_7$ and various amounts of $NH_4F$. FIG. 1 shows that a leakage current measured at 10 volts of working voltage in aforesaid manner decreases remarkably with an increase in the amount of $NH_4F$ up to about 0.1 wt. percent and increases slightly with increasing the amount above 0.4 wt. percent after keeping a constant value with respect to added amount of $NH_4F$. FIG. 1 shows that the novel effect of the anodizing electrolyte comprising $NH_4F$ is emphasized by heating the titanium plates at the higher temperature of 1300° C.

EXAMPLE 3

Various pretreatments listed in Table 2 are applied to commercially available titanium plates of high purity and to a titanium alloy comprising 4 wt. percent of Al, 3 wt. percent of Mo and 1 wt. percent of V.

Figure 2:
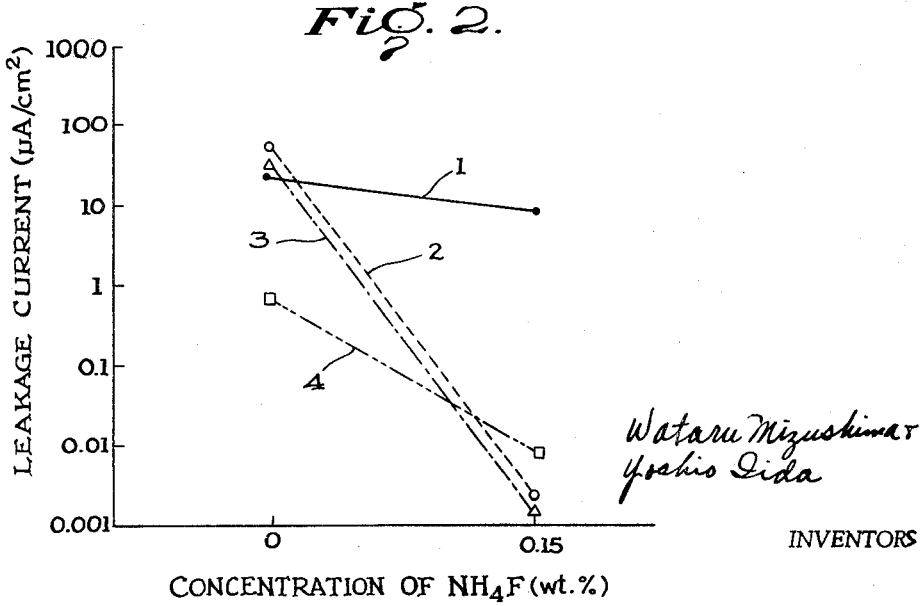
FIG. 2 is a graph showing the effect of pretreatment of titanium on the leakage current of dielectric film of titanium as a function of the concentration of ammonium fluoride ($NH_4F$) dissolved in an anodizing electrolyte.

Each plate is anodically oxidized at 80 volts of formation voltage for 10 minutes at 25° C. in an aqueous electrolyte comprising 5 wt. percent of $NH_4HB_4O_7$ accompanied by 0.15 wt. percent of $NH_4F$ and by no $NH_4F$, the remainder being water. The leakage current measured at 10 v. in aforesaid manner is plotted in FIG. 2 wherein the reference notations indicate corresponding samples listed in Table 2. The novel effect of the electrolyte according to the invention is clearly promoted by heating the titanium in hydrogen at 400° C. FIG. 2 also shows that the titanium alloy treated with aqueous solution of HF and $HNO_3$ promotes the novel effect of the anodizing electrolyte according to the invention.

TABLE 2

| Sample No. | Material | Pretreatment |
|---|---|---|
| 1 | Pure Ti | Immersing in an aqueous solution of 10 wt. percent of HF and 20 wt. percent of $HNO_3$. |
| 2 | do | Heating at 1,200° C. in a reduced pressure of $10^{-6}$ mm. Hg. |
| 3 | do | Heating at 400° C. in $H_2$ after second pretreatment. |
| 4 | Ti alloy | Immersing in an aqueous solution of 10 wt percent of HF and 20 wt. percent of $HNO_3$. |

What is claimed is:

1. In a method of making a dielectric film on the surface of titanium or titanium alloy by anodic oxidation in an anodizing electrolyte, the improvement wherein the electrolyte is a solution consisting essentially of 0.01 to 0.4 wt. percent of a fluorine compound selected from the group consisting of ammonium fluoride, potassium fluoride, hydrofluoric acid and sodium fluoride, and of 1 to 10 wt. percent of a conductive solute selected from the group of $NH_4HB_4O_7$, $KH_2PO_4$ and $H_3PO_4$, in water.

2. The method of claim 1 wherein titanium is anodized and prior to anodization, said titanium is heated at about 1000° C. in air at a pressure lower than $10^{-4}$ mm. Hg.

3. The method of claim 1 wherein titanium is anodized and prior to anodization, said titanium is heated to a temperature of 400° to 1000° C. in hydrogen.

4. The method of claim 1 wherein titanium alloy is anodized and prior to anodization said titanium alloy is etched by an aqueous solution comprising hydrofluoric and nitric acid and then cleansed with water.

5. In a method of making a dielectric film on the surface of titanium or titanium alloy by anodic oxidation in an anodizing electrolyte, the improvement wherein the electrolyte is a solution consisting essentially of 0.1 to 5.0 wt. percent of a fluorine compound selected from the group of antimony fluoride, stannous fluoride, zinc fluoride and cadmium fluoride and of 5 to 60 wt. percent of an organic solvent selected from the group of glycol, glycerine, methanol, formamide and ethanolamine, in water.

6. The method of claim 5 wherein titanium is anodized and prior to anodization, said titanium is heated at above 1000° C. in air at a pressure lower than $10^{-4}$ mm. Hg.

7. The method of claim 5 wherein titanium is anodized and prior to anodization, said titanium is heated to a temperature of 400° to 1000° C. in hydrogen.

8. The method of claim 5 wherein titanium alloy is anodized and prior to anodization said titanium alloy is etched by an aqueous solution comprising hydrofluoric and nitric acid and then cleansed with water.

9. In a method of making a dielectric film on the surface of titanium or titanium alloy by anodic oxidation in an anodizing electrolyte, the improvement wherein the electrolyte is a solution consisting essentially of 0.1 to 5 wt. percent of a fluoro complex compound selected from the group consisting of $NH_4BF_4$, $(NH_2)_2SiF_6$, $Zn(BF_4)_2$ and $ZnSiF_6$, in water.

10. The method of claim 9 wherein titanium is anodized and prior to anodization, said titanium is heated at above 1000° C. in air at a pressure lower than $10^{-4}$ mm. Hg.

11. The method of claim 9 wherein titanium is anodized and prior to anodization, said titanium is heated to a temperature of 400° to 1000° C. in hydrogen.

12. The method of claim 9 wherein titanium alloy is anodized and prior to anodization said titanium alloy is etched by an aqueous solution comprising hydrofluoric and nitric acid and then cleansed with water.

References Cited

UNITED STATES PATENTS 3,198,718  8/1965  Quinn _____ 204—56

OTHER REFERENCES

"Corrosion," vol. 10, April 1954, p. 60.

HOWARD S. WILLIAMS, Primary Examiner

R. L. ANDREWS, Assistant Examiner